US009043989B2

(12) United States Patent
Devine et al.

(10) Patent No.: US 9,043,989 B2
(45) Date of Patent: Jun. 2, 2015

(54) METHOD AND APPARATUS FOR PROVIDING CLEAN AIR TO ANIMAL ENCLOSURES

(75) Inventors: Steven T. Devine, Rockaway, NJ (US); Anders Sundvik, Hoboken, NJ (US)

(73) Assignee: Camfil USA, Inc., Riverdale, NJ (US)

( * ) Notice: Subject to any disclaimer, the term of this patent is extended or adjusted under 35 U.S.C. 154(b) by 580 days.

(21) Appl. No.: 12/132,854

(22) Filed: Jun. 4, 2008

(65) Prior Publication Data

US 2009/0301402 A1  Dec. 10, 2009

(51) Int. Cl.
*A01K 1/00* (2006.01)
*A01K 1/02* (2006.01)

(52) U.S. Cl.
CPC .............. *A01K 1/0047* (2013.01); *A01K 1/00* (2013.01); *A01K 1/02* (2013.01)

(58) Field of Classification Search
CPC . A01K 1/0047; A01K 1/0052; A01K 1/0058; A01K 1/0064
USPC .......... 119/448, 447, 493, 419; 52/79.8, 79.7, 52/79.5, 79.1; 454/238
See application file for complete search history.

(56) References Cited

U.S. PATENT DOCUMENTS

| 3,951,336 | A | * | 4/1976 | Miller et al. ................... 454/238 |
| 4,292,927 | A | * | 10/1981 | Sassmann ...................... 119/448 |
| 2004/0144254 | A1 | * | 7/2004 | Wiser et al. ........................ 96/66 |
| 2004/0146437 | A1 | * | 7/2004 | Arts et al. ................. 422/186.07 |
| 2007/0204579 | A1 | * | 9/2007 | Karlsson et al. ................ 55/497 |
| 2009/0038552 | A1 | * | 2/2009 | Baker et al. ................. 119/14.03 |

FOREIGN PATENT DOCUMENTS

JP  3139417 U  *  2/2008

OTHER PUBLICATIONS

NAFA User's Guide for ANSI/ASHRAE 52.2 "http://www.nafahq.org/LibaryFiles/Articles/Article006.htm" , by the NAFA Technical Committee.*
Durafil® 4V, High Capacity, High Efficiency, V-Style Air Filter in All Plastic Enclosing Frame, Product Sheet, Camfil Farr, copy consists of 2 pages.
Colin Johnson et al., "The Impact of PRRS on the Pig Cost of Production", Iowa State University Animal Industry Report 2005, copy consists of 1 page.
Andrea Pitkin et al., "Aerosol transmission of PRRSV: Application to the field", 2007 Allen D. Leman Swine Conference, copy consists of 1 page.

(Continued)

*Primary Examiner* — Joshua Huson
(74) *Attorney, Agent, or Firm* — Patterson & Sheridan, LLP

(57) ABSTRACT

A method and apparatus for economically filtering air into swine farms and other animal enclosures are provided. Advantageously, the invention substantially reduces the risk to airborne transfer of disease into animal enclosures. In one embodiment, a method for providing clean air to an animal enclosure includes providing an animal enclosure having an animal containing volume for containing a plurality of animals, removing air from the internal volume via at least one exhaust fan, and filtering air being pulled into the enclosure by the at least one exhaust fan using a fully sealed filter, the fully sealed filter having a particle separation sufficiently efficient to prevent detection of live (PRRS-) virus downstream of the filter, using polymerase chain reaction (PCR) analysis of samples collected with a cyclonic aerosol collector.

17 Claims, 7 Drawing Sheets

(56) References Cited

OTHER PUBLICATIONS

Steve Pohl, "Engineering air filtration systems of swine facilities", 2007 Allen D. Leman Swine Conference, pp. 86-88.

Andrea Johnson, "Filters can keep PRRS virus away from pigs", 2008 Farm & Ranch Guide, http://www.farmandranchguide.com, copy consists of 4 pages.

Scott A. Dee, "Area spread of PRRSV: End of story?", 2007 Allen D. Leman Swine Conference, pp. 3-11.

Scott A. Dee, et al., "Further evaluation of alternative air-filtration systems for reducing the transmission of Porcine reproductive and respiratory syndrome virus by aerosol", The Canadian Journal of Veterinary Research, 2006, pp. 168-175.

U.S. Appl. No. 12/023,571, "High Flow V-Bank Filter" filed with the U.S. Patent and Trademark Office, Jan. 31, 2008, copy insists of 27 pages.

\* cited by examiner

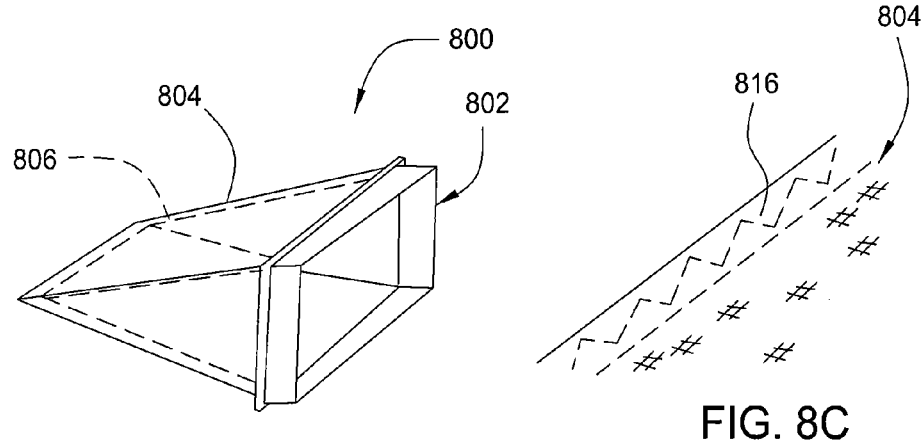
FIG. 8A
FIG. 8C
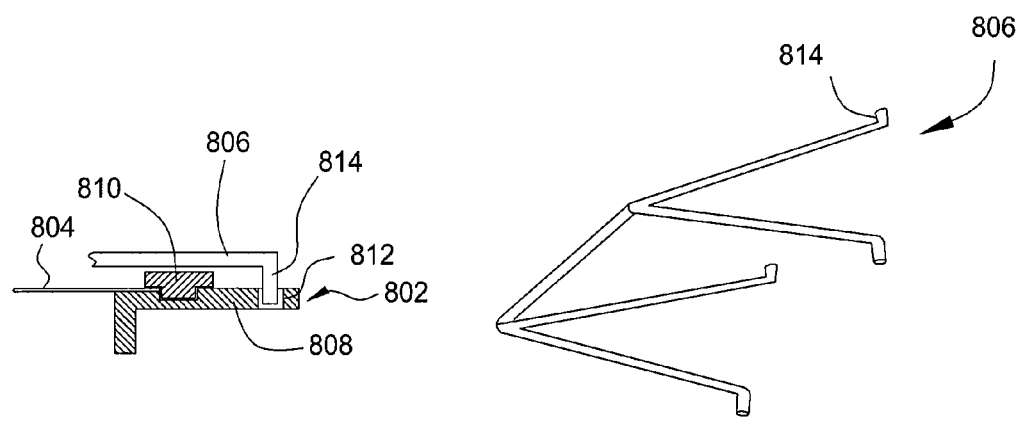
FIG. 8B
FIG. 8D

METHOD AND APPARATUS FOR PROVIDING CLEAN AIR TO ANIMAL ENCLOSURES

BACKGROUND OF THE INVENTION

1. Field of the Invention

Embodiments of the invention generally relate to a method and apparatus for providing clean air to animal enclosures.

2. Description of the Related Art

The global swine industry has over the last years increased their efforts to prevent infection of PRRS-virus (Porcine Reproductive and Respiratory Syndrome Virus) on commercial swine farms. PRRS-virus has a significant impact on the profitability in the swine production. The virus causes periods of reproductive failure, reduced growth and increased mortality within the swine population. The cost caused by PRRS-virus is significant for the swine industry. A study made by Iowa State University shows that PRRS increases the average production cost per head sold by somewhere from $5.60 to $7.62. The actual cost for PRRS positive farms is far higher and could potentially cause long term complications with re-infection when re-populating the farm with naïve swine.

One of the largest challenges in preventing infection of naïve swine populations from PRRS is the prevention of routes of indirect virus transmission, e.g., cross contamination between farms by vehicles, insects or humans, but also via aerosols transported with the wind through the air. Most farms already follow strict bio-security protocols to prevent transmission though physical contact and more and more farmers are currently looking into solutions of preventing the spread transmitted through air.

High efficiency air filters have been proven to be very effective in prevention of aerosol/air transmission. Filters that effectively separate small particles (0.4 μm or bellow) also tend to have a high resistance to airflow. Consequently, conventional high efficiency air filters require a significant amount of energy usage to move air through the filters. Thus, the use of conventional high efficiency air filters is not a desirable solution. The challenge for the filtration industry is to find a solution that effectively stops PRRS-virus while providing an economical supply of fresh filtered air in the swine facility. Factors that are considered in whether a solution is economical include the cost of installation, the cost of replacement filters, and maintenance.

Therefore, there is a need for an improved method and apparatus for filtering air into swine farms and other animal enclosures.

SUMMARY OF THE INVENTION

Embodiments of the invention generally relate to a method and apparatus for economically filtering air into swine farms and other animal enclosures. The present invention provides a method and apparatus for economically filtering air into swine farms and other animal enclosures. Advantageously, the invention substantially reduces the risk to airborne transfer of disease into animal enclosures. In one embodiment, a method for providing clean air to an animal enclosure includes providing an animal enclosure having an animal containing volume for containing a plurality of animals, removing air from the internal volume via at least one exhaust fan, and filtering air being pulled into the enclosure by the at least one exhaust fan using a fully sealed filter, the fully sealed filter having particle separation sufficiently efficient to prevent detection of live (PRRS-) virus downstream of the filter, using polymerase chain reaction (PCR) analysis of samples collected with a cyclonic aerosol collector. In one embodiment, the fully sealed filter has an efficiency of about MERV 13 to about MERV 16 and a pressure drop between 0.25 to 1.00 inches water gage at 2000 cubic feet per minute (CFM).

In another embodiment, a method for providing clean air to an animal enclosure includes providing an animal enclosure having an animal containing volume for containing a plurality of animals, the animal containing volume defined between a ceiling, sidewalls and floor of the animal enclosure, the animal enclosure additionally having a pit located below the floor for receiving waste from animals within the enclosure through the floor, the animal enclosure having a first fully sealed filter and a second fully sealed filter, the fully sealed filter having particle separation sufficiently efficient to prevent detection of live (PRRS-) virus downstream of the filter, using polymerase chain reaction (PCR) analysis of samples collected with a cyclonic aerosol collector, operating a first exhaust fan to remove air from the animal containing volume via the pit, and filtering air being pulled into the enclosure by the first exhaust fan using at least one of the fully sealed filters.

In yet another embodiment, an animal enclosure is provided that include a ceiling, sidewalls and a floor surrounding an animal containing volume. A pit is located below the floor for receiving waste from animals within the animal containing volume through the floor. A first exhaust fan is configured to ventilate the pit and animal containing volume. A second exhaust fan is configured to ventilate the animal containing volume. A first fully sealed filter is sealingly coupled to the sidewalls and configured to filter air entering the animal containing volume through the sidewalls. A second fully sealed filter is sealingly configured to filter air entering the animal containing volume through the at least one of the roof or eaves, wherein the fully sealed filters have an efficiency of about MERV 13 to about MERV 16 and a pressure drop between 0.25 to 1.00 inches water gage at 2000 cubic feet per minute (CFM).

BRIEF DESCRIPTION OF THE DRAWINGS

The teachings of the present invention can be readily understood by considering the following detailed description in conjunction with the accompanying drawings, in which:

FIGS. 8A-D depict one embodiment of a fully sealed, non-supported pocket filter.

To facilitate understanding, identical reference numerals have been used, where possible, to designate identical elements that are common to the figures. It is contemplated that elements and features of one embodiment may be beneficially incorporated in other embodiments without further recitation.

It is to be noted, however, that the appended drawings illustrate only exemplary embodiments of this invention and are therefore not to be considered limiting of its scope, for the invention may admit to other equally effective embodiments.

DETAILED DESCRIPTION

The present invention provides a method and apparatus for economically filtering air into swine farms and other animal enclosures. Advantageously, the invention substantially reduces the risk to airborne transfer of disease into animal enclosures. Moreover, existing animal enclosures may be adapted to utilize the invention without major modification or expense. Although the embodiment below is exemplarily described in the context of a swine farm, it is contemplated the invention may beneficially adapted for used in enclosures utilized for other animals wherever prevention of the introduction of unwanted airborne hazards into an enclosure is desired.

As utilized herein, an animal enclosure is a building, barn or shed utilized to retain a plurality of animals commercially raised in a communal setting for food production, fur, breeding and the like. As such, an animal enclosure is not a room in a research facility or other structure, or an individual animal pen. A factory farm is a facility that utilizes such an animal enclosure.

Figure 1:
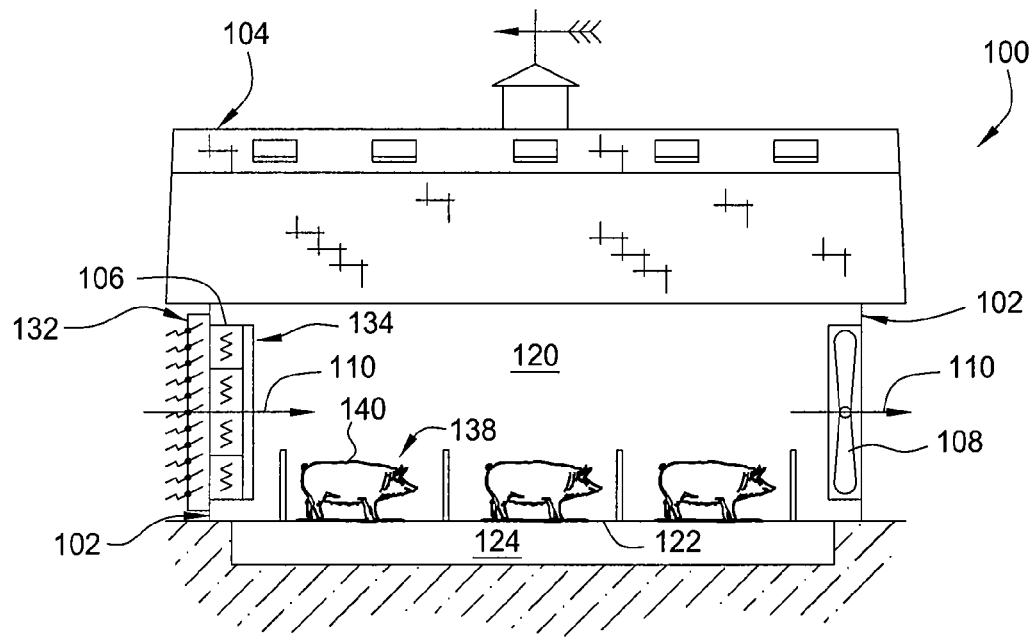
FIG. 1 is schematic front view of one embodiment of a filtered animal enclosure of the present invention.
Figure 2:
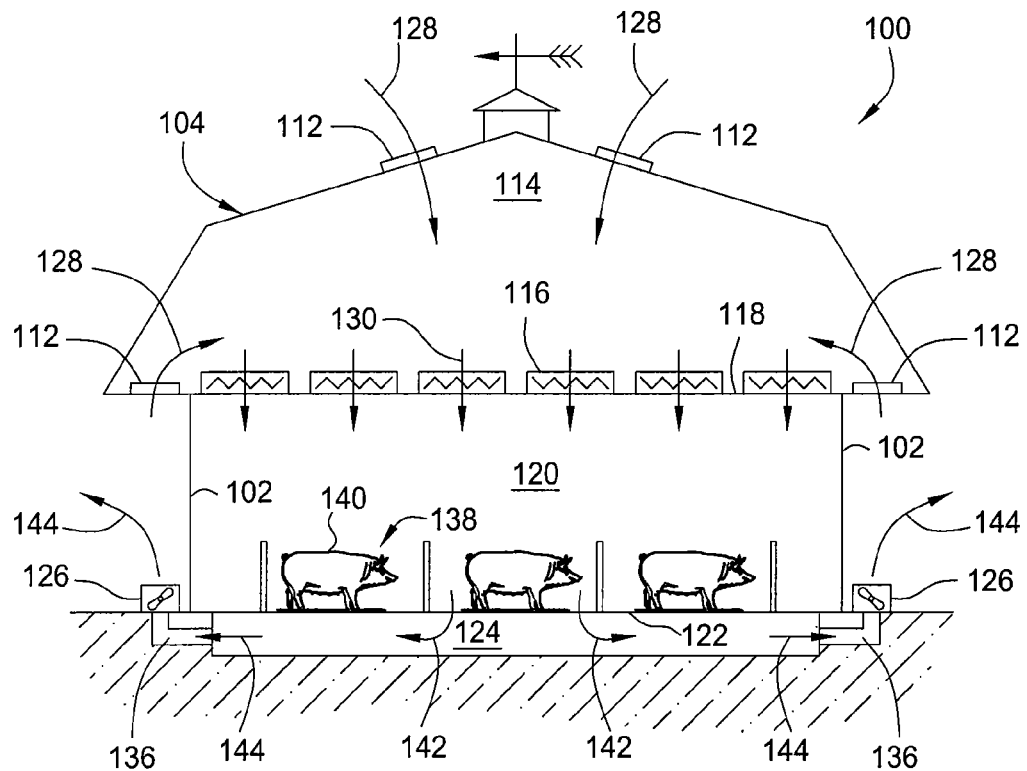
FIG. 2 is schematic side view of the filtered animal enclosure of FIG. 1.

FIGS. 1-2 depict one embodiment of an animal enclosure 100 of the present invention. Animal enclosures utilized for industrial pork production may differ from facility to facility. For example, the architecture of the animal enclosure is often related to the age of the building and depending of kind of production activity (breeding, nursing, finishing etc. . . . ) for which the building is designed. Thus, the animal enclosure 100 of FIGS. 1-2 is provided as a simplified exemplary embodiment in which the inventive features are illustrated, and should not be utilized for limiting the configuration in which the invention may be implemented. As such, it is contemplated that the inventive features and method described may be adapted for used in other animal enclosures.

The animal enclosure 100 generally includes sidewalls 102 supporting a roof 104. The walls 102 surround an animal enclosure volume 120 in which animals 140, such as pigs, fowl or other commercially raised animals, are held, typically in pens 138. At least one of the sidewalls 102 has a passage that is filtered by one or more sealed air filters 106. The definition of a "fully sealed" filter is given further below. At least one of the sidewalls 102 includes a passage in communication with one or more exhaust fans 108. In one embodiment, the fan 108 is a low pressure axial fan commonly utilized for building ventilation. The construction of the portions of the animal enclosure 100 defining the boundaries of the animal enclosure volume 120 may optionally be sealed to prevent unwanted air leakage into the animal enclosure volume 120. For example, the corners of the walls 102, ceiling 118 and floor 122 may be caulked or otherwise constructed in a manner that prevents leakage into the animal enclosure volume 120 when the animal enclosure volume 120 may be maintained at a pressure of 0.05 to about 0.50 inches water gage less than that of the surrounding environment without significant by-pass of the enclosure's air filtering system.

In a first mode of operation, the exhaust fan 108 is utilized to remove air from the animal enclosure 100, while pulling fresh air into the enclosure 100 through the filters 106, as indicated by arrows 110. This mode of operation may be utilized when a high amount of air exchange is desired, for example, during times of warm to hot meteorological conditions.

The wall 102 to which the filters 106 are mounted may optionally include a sealing mechanism 132 which may be selectively activated to prevent air flow through the filters 106. The sealing mechanism 132 may be a shutter, door, damper or other suitable device.

The air entering the animal holding volume 120 through the filters 106 may optionally be cooled. In the embodiment depicted in FIG. 1, a cooler 134 is provided adjacent the filters 106. The cooler 134 may be an evaporative cooling coil positioned in the air flow path 110 or other suitable device.

The animal enclosure 100 may additionally include vents 112 formed through the roof 104 and eaves of the enclosure to allow outside air to enter an attic plenum 114. The attic plenum 114 is separated from the animal holding volume 120 by the ceiling 118. A plurality of fully sealed air filters 116 are mounted to the ceiling to allow air to flow from the attic plenum 114 into the animal holding volume 120 as shown by arrows 130.

The floor 122 of the animal enclosure 100 generally includes grates or other apertures which allow animal waste from the pens 138 holding the animals 140 to fall into a pit 124 formed below the animal enclosure 100. The pit 124 is ventilated through a conduit 136 by an exhaust fan 126. The exhaust fans 126 may be operated to ventilate the pit 124 while the exhaust fans 108 are operating in a first mode of operation or during a second mode of operation when the exhaust fan 108 is off. Thus, in a second mode of operation, the exhaust fans 126 are utilized to remove air from the animal holding volume 120 by pulling outside air into the attic plenum 114 and through the filters 116 and into the animal holding volume 120, then through the graded floor 122 and out the pit 124, as shown by arrows 128, 130, 142 and 144. Therefore, second mode of operation may be utilized to ventilate the animal holding volume 120 and to ventilate the pit 124. During periods wherein the temperature within the enclosure 100 requires additional ventilation to maintain a desired temperature within the enclosure, the first mode of operation described above may be utilized in addition to or in place of the second mode of operation. If the animal enclosure is being ventilated solely by the second mode of operation, the sealing mechanism 132 may be put in a state that substantially prevents air intrusion into the animal enclosure 100.

Figure 3:
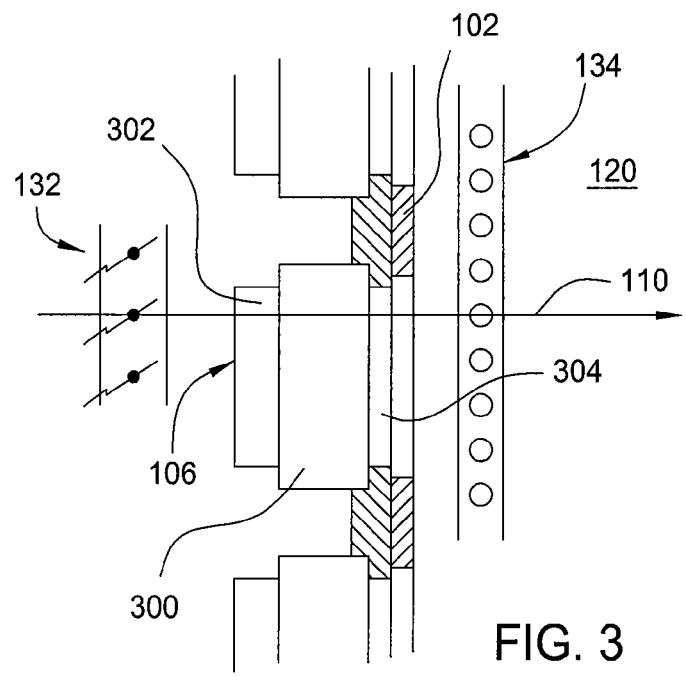
FIG. 3 is a schematic partial side view of a sidewall of the animal enclosure of FIG. 1.

FIG. 3 is a schematic partial side view of the sidewalls 102 of the animal enclosure 100 of FIG. 1 illustrating one implementation of a fully sealed filter 106. The fully sealed filter 106 is a primary filter 300 having an optional a pre-filter 302 mounted thereto. The primary filter 300 is a fully sealed filter as described herein. The pre-filter 302 may or not be fully sealed. The primary filter 300 is mounted to the sidewall 102 via a holding frame 304, as known in the art, to provide an air-tight seal between the primary filter 300 and the wall 102. Thus, when in operation, the air flow, as shown by arrow 110, is drawn through the sealing mechanism 132 through the pre-filter 302 and primary filter 300 and through the sidewall 102 and into the animal holding volume 120. Although it is shown with the filters 106 mounted on the exterior side of the sidewalls 102, it is contemplated that the filters 106 may be mounted on the interior side of the sidewalls 102 inside the animal holding volume 120.

Figure 4:
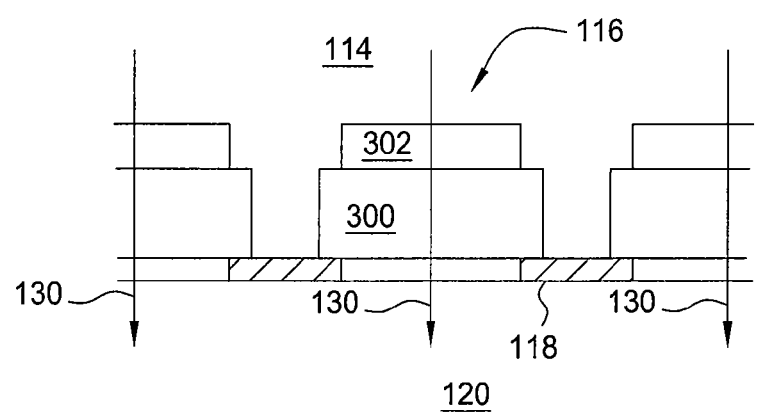
FIG. 4 is a schematic partial side view of a ceiling of the animal enclosure of FIG. 1.

FIG. 4 is a schematic partial side view of the ceiling 118 of the animal enclosure 100. The ceiling 118 separates the attic plenum 114 and the animal holding volume 120. Air passing between the attic plenum 114 and the animal holding volume 120 is filtered by filters 116. In one embodiment, the filters 116 may include a primary filter 300 and a pre-filter 302 as described above. The primary filter 300 may be sealed directly to the ceiling 118 and mounted to the ceiling 118 using a holding frame similar to that shown in FIG. 3, or be mounted in a room-side replaceable filter module such as those commercially available from Camfil Farr, Inc.

Although the embodiment of FIG. 4 depicts the filters 116 positioned above the ceiling 118, it is contemplated that the filters may be mounted below the ceiling 118 or mounted in another position below the roof 104 of the animal enclosure 100, such that the outlet of the primary filter 300 is ducted through the ceiling 118 and/or the walls 102 of the animal enclosure. It is additionally contemplated that the attic plenum may be eliminated by directly ducted the filters 116 to the vents 112.

The invention may be implemented on an existing animal enclosure by retrofitting the air inlet on the attic with filter housings capable of holding one or more high efficiency primary filters 300 (e.g. Durafil MV16) equipped with pre-filters 302 (e.g. 30/30 or Aeropreat III) protecting the more efficient and expensive primary filter 300. During the colder season (when there is higher risk for PRRS transmission) the filters 116 would provide sufficient air supply to the barn while the high capacity filters 106 would be sealed off by the sealing mechanism 132. In case existing air inlets are too few, additional openings may be retrofitted to the ceiling. In one embodiment, there are about 3 to 4 times less filters 116 in the ceiling 118 than the number of filters 106 positioned in the sidewalls 102 due to the smaller amount of ventilation required during cooler periods.

During the hot season, ventilation of the animal containing volume through the ceiling filters 116 is complimented by flow through the filters 106 which provide a high capacity air intake for the enclosure 100. The amount of filters 106, 116 required to satisfy ventilation needs is selected so that each swine in the enclosure 100 would have a nominal air supply of about 250 cfm/head. Although the filter 106 is shown interfaced with a single sidewall 102 in this example, it is likely that the amount of filters required for most commercial buildings will necessitate at least some filters to be on the longer sidewall of the enclosure. Since the filters 106 are used primarily during the warm season when risk of virus transmission is lower, an alternative is to use filters having slightly efficiency to benefit from a lower air resistance, thereby reducing the total amount of filters needed.

The purpose of the air filters is to remove particles and/or molecules from an air stream, such as particles and/or molecules which may carry hazards such as viruses into the animal enclosure. In the case of particle removal, typically a fibrous material is used to capture the particles and in case of capturing molecules typically selected types of absorbents will be used (e.g. activated carbon). Several kinds of basic filtration mechanisms decide how well the filter will separate particles and molecules from the air stream at a specific air velocity. It is well known that for small particles and molecules (particle and molecular sizes below 0.4 µm) the efficiency of particle capture increases with lower air velocity through the media.

If a leak or bypass to the filter element is present, the air will partially pass un-filtered through the filter. Since relatively more air will pass through the leak at lower air velocities than at higher air velocities, a leaking filter will show less effective particle capture at lower air velocities than at higher. A filter having the filtering elements contiguously sealed to its housing will not exhibit a drop in efficiency at lower flow rates. Thus, a fully sealed filter is therefore defined as a filter that provides equal or better particle capture at lower air velocities than at higher air velocities. A fully sealed filter may also be defined as a filter having particle separation sufficiently efficient to prevent detection of live (PRRS-) virus downstream the of filter, using polymerase chain reaction (PCR) analysis of samples collected with a cyclonic aerosol collector, or a fully sealed filter having particle separation sufficiently efficient to protect a live animal subject located downstream of the filter from becoming infected at an upstream aerosol virus concentration of $1\times10^5$ to $1\times10^{10}$ TCID50 distributed by a cold fog mister into a continuous air flow of approximately 250 CFM, wherein TCID50 is the tissue culture infective dose that produces infection in 50 percent of the sample tissue. A fully sealed filter may also be defined as a filter having about 60 to 99 percent efficiency rating at 0.4 micron particles at 2000 CFM flow rates which also provides equal or better particle capture at air velocities lower than the velocity at 2000 CFM flow rates, for example, at 200-600 CFM. Examples of some filters which may be modified into a fully sealed configuration to benefit from the invention include filters having a MERV 13-16 and ASHRAE 52.2 ratings, among others.

Several studies have been recently carried out by Dr. Scott Dee of Iowa State University that show HEPA filters provide the best solution in terms of protection against PRRS-virus. However the high air resistance and cost of these filters prevents a practical implementation of a HEPA filter solution for animal enclosures. In his search for alternative to the use of HEPA filters, Dr. Scott Dee has found the Camfil Farr Durafil M16 (also called Durafil DOP 95) is a viable alternative. The Durafil M16 filter has significantly lower cost and pressure drop than HEPA filters while still providing a very high level of protection against PRRS-virus transmission. Although the Durafil MV16 is a high efficiency filter, it is not a fully sealed filter (meaning that the efficiency drops at lower flows, but still meets the Merv rating at rated airflow of 2000 CFM). Due to the limited fan capacity utilized in animal enclosures, the flow rate across the filters is about 300 to about 600 CFM. At these flow rates the efficiency of conventional non-sealed filters, such as the Durafil M16 filter, is significantly lower than at the 2000 CFM rating. Lab testing of non-fully sealed filters show that a Durafil MV16 (Merv 16) can drop as low as Merv rating 12 at flow rates close to 600 CFM. In contrast, the fully sealed filters of the present invention maintain their Merv rating from 2000 CFM to at least 300 CFM (e.g., the complete span of the about 300 to about 600 CFM flow rates utilized in animal enclosure applications) and that the efficiency of the particle capture would actually increase instead of decrease at lower flow rates.

Given these test results, the use of fully sealed filters will provide great benefit to operators of the animal enclosure. Choosing the same filter with the same resistance to air the user would benefit form a higher separation of particles or in this case a higher level of protection against PRRSV transmission. Analogue to this remaining with the same level of protection of PRRSV transmission the user could chose a filters with lower resistance to air (normally these filters are less costly) and thereby be able to dimension the filtration system with fewer filters or use same number of filters and benefit from higher air flow.

Figure 5:
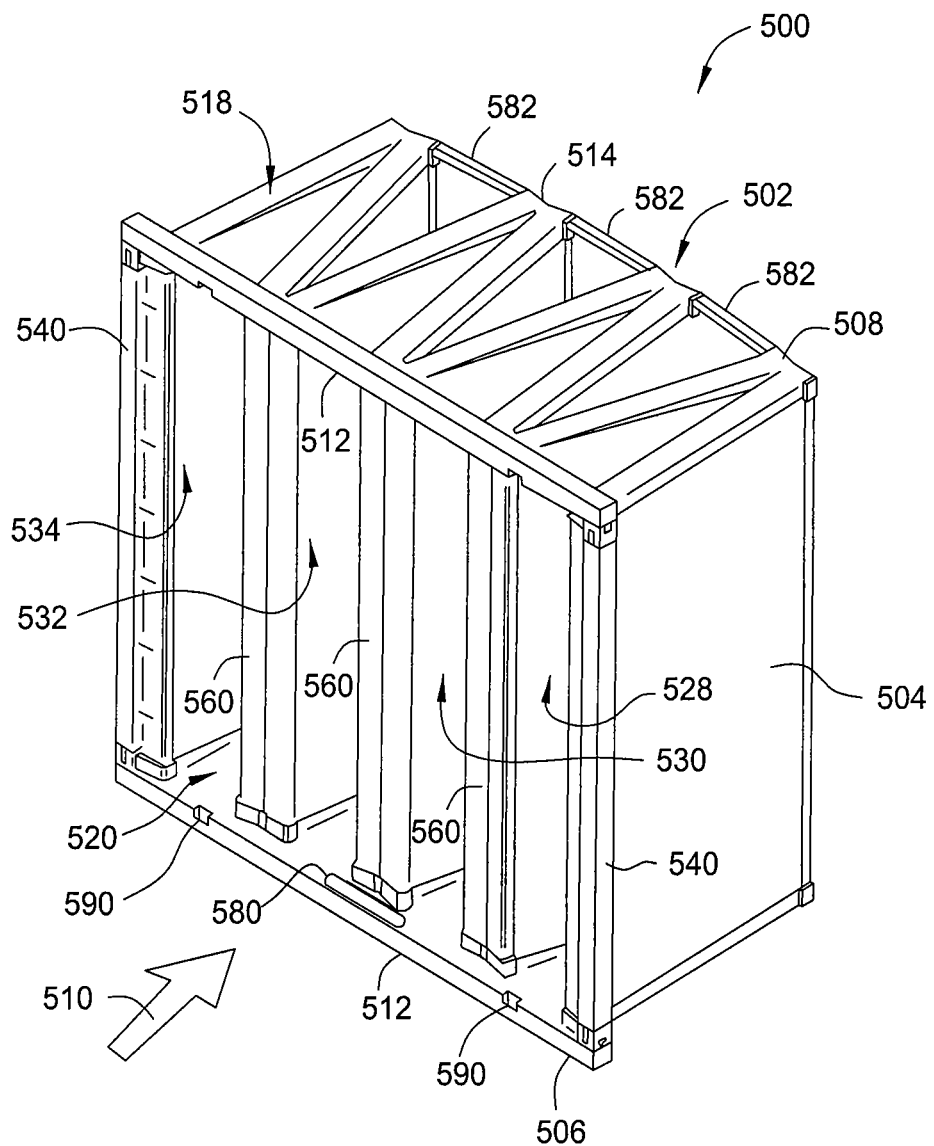
FIGS. 5-6 are isometric and exploded views of one embodiment of a sealed V-bank filter according to one embodiment of the present invention.
Figure 6:
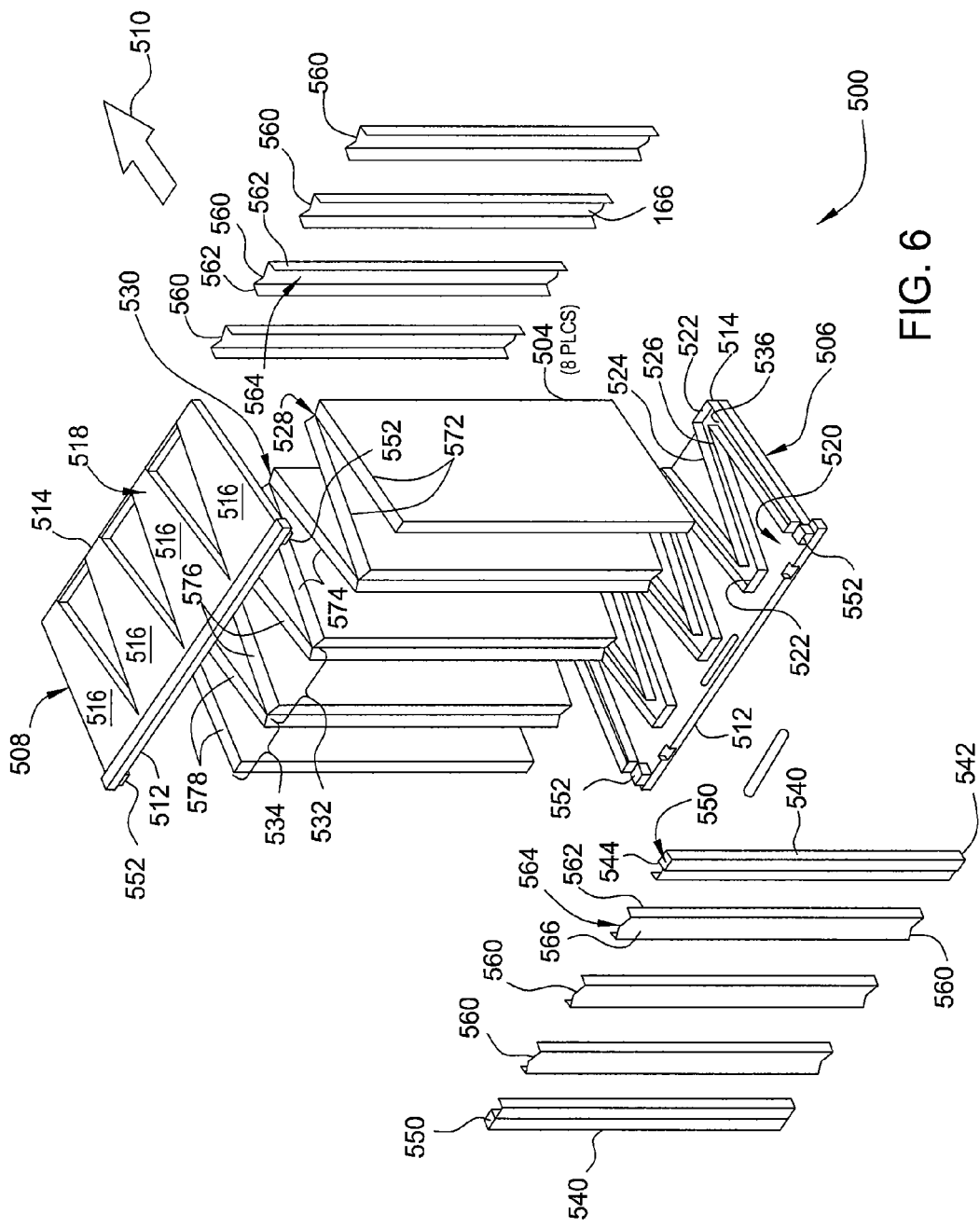
Figure 7A:
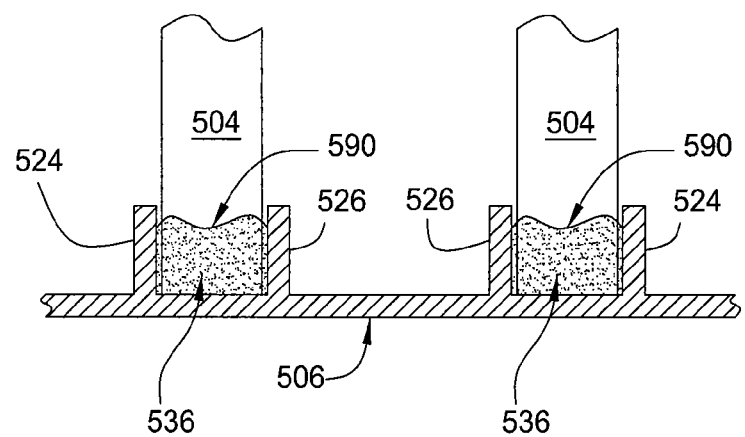
FIGS. 7A-C depict partial sectional views of different portions of the V-bank filter of FIG. 5 illustrating filter element-to-frame seals.
Figure 7B:
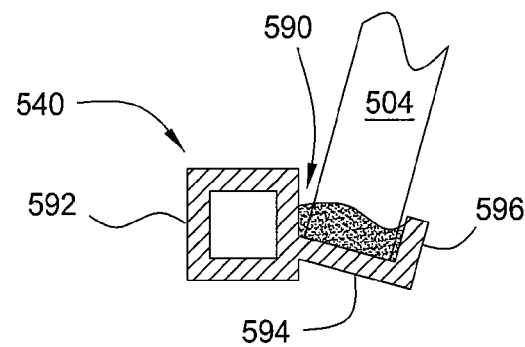
Figure 7C:
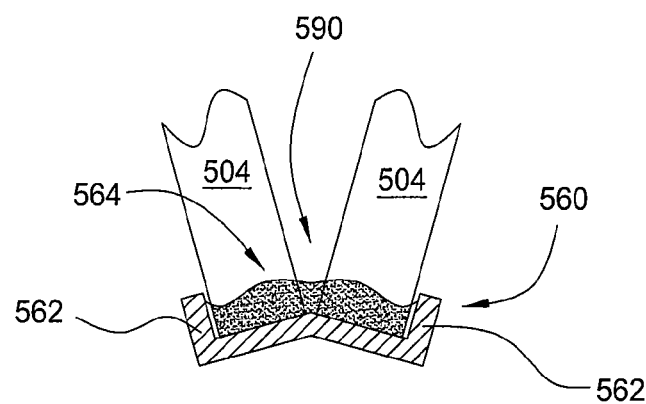

FIGS. 5-6 are exploded isometric views of one embodiment of a sealed V-bank filter 500. FIGS. 7A-C depict partial sectional views of different portions of the V-bank filter 500 illustrating filter element-to-frame seals. The air flow direction through the filter 500 is indicated by arrow 510. The direction of the arrow 510 is orientated as v-type filters are typically utilized, but it is contemplated that flow direction through the filter 500 may be in the reverse direction.

The V-bank filter 500 includes a housing 502 containing a plurality of filter elements 504. In one embodiment, the housing 502 and filter elements 504 comprise a unitary replaceable filter. In another embodiment, the filter elements 504 may be selectively replaced from the housing 502.

In the embodiment depicted in FIG. 5, the housing 502 includes a first side panel 506 and a second side panel 508. The side panels 506, 508 may be fabricated from a metal, wood, plastic or other suitable material. In one embodiment, the side panels 506, 508 are fabricated from polymer. In another embodiment, the side panels 506, 508 are fabricated from an environmentally friendly and/or combustible material, for example metal, wood, plastic and/or cardboard.

The filter element 504 generally has, but is not limited to, a rectangular form. The filter element 504 may be a pleated pack of filtration media. Un-pleated filter elements are also contemplated. The filtration media comprising the filter element 504 may be a glass-based media or synthetic media or other suitable media. The filtration media may include antibacterial, antifungal, gas phase absorbent or other additive. The filter element 504 may have between about 60 to about 99 percent efficiency for 0.4 micron particle size at about 5.3 cm/s media test velocity.

The side panels 506, 508 include parallel first edges 512 that are oriented substantially perpendicular to the flow direction 510. The first edges 512 may be substantially parallel to each other. The second edges 514 of the side panels 506, 508 may be configured in a plurality of v-shaped extensions 516 which accommodate a portion of the filter elements 504. In such an embodiment, the second edge 514 may be defined by connecting the ends of the v-space extensions 516. The second edge 514 may be parallel to the first edge 512, or in another embodiment, have a curved configuration relative to the first edge 512. The side panels 506, 508 include an exterior side 518 and an interior side 520. The interior side 520 of each side panel 506, 508 faces the filter elements 504. The interior side 520 of each side panel 506, 508 includes a pair of spaced flanges 524, 526 at least partially arranged in an accordion fashion to maintain at least two pairs of the filter elements 504 in at least two banks of vees, shown as four V-banks 528, 530, 532, 534 in FIGS. 5-6.

The flanges 524, 526 generally define a trough 536 which retains the ends of the filter elements 504. The edges of the trough 536 closest the first and second edges 512, 514 of the panels 506, 508 are bounded by a flange 522 that connect adjacent pairs of flanges 524, 526, while of the edges of the trough opposing the flanges 522 are defined at an intersection of the opposing adjacent of flanges 524, 526.

The trough 536 confines a sealant 590 (as shown in FIG. 7A) that may be used to provide a seal between the filter elements 504 and the side panels 506, 508. The sealant 590 may be an adhesive, potting compound, gasket, gel, adhesive tape, foam, high loft media or other suitable sealing material. In one embodiment, the sealant 590 is a polyurethane-based adhesive. The seal provided by the sealant 590 directs enough air through the filter element such that the filter meets the fully sealed criteria described above. It is contemplated that the sealant 590 may be replaced by a mechanical seal, such as a clamp.

The side panels 506, 508 are maintained in a spaced apart relation by a pair of end channels 540. Each end channel 540 is coupled at a first end 542 to the side panel 506 and at a second end 544 to the side panel 508. The end channel 540 may be fabricated from metal, plastic, wood product or other suitable material. The end channel 540 may be fabricated from multiple components.

In the embodiment depicted in FIG. 5, each end channel 540 includes a female feature 550 that accepts a mating male feature 552 of the side panel. The female feature 550 may be a channel, slot, hole or other suitable form. The male feature 552 may be a boss, tab or other shape/profile projecting from the side panel suitable for engaging the female feature 550.

The end channel 540 includes a main body 592 and a flange 594. The main body 592 is elongated. The flange 594 extends from the main body 592 to a lip 596. The flange 594 is generally wide enough to accept the filter element 504, which is sealed thereto by additional sealant 590 (as shown in FIG. 7B).

The filter elements 504 are arranged in at least two pairs of vees. In the embodiment depicted in FIGS. 5-6, a first pair 572 of filter elements 504 are arranged in a first vee, a second pair 574 of filter elements are arranged in a second vee, a third pair 576 of filter elements are arranged in a third vee, while a fourth pair 578 of filter elements are arranged in a fourth vee. An end cap 560 is disposed in the vertices of each pair of filter elements. The end cap 560 includes an elongated body 566 having opposing lips 562 which define a channel 564. The channel 564 is wide enough to accommodate the ends of the filter elements 504 comprising the vee-pair, while narrow enough to fit within the trough 536 of the side panels adjacent the flange 522. The lips 562 are generally high enough to retain sealant 590 (as shown in FIG. 7C) dispensed into the end cap 560 which seals the adjacent filter elements 504. Thus, the sealant 590 fully seals all edges of the filter elements 504 to the filter housing so that leakage or air by-pass of the filtration media when in use is prevented.

In an alternative embodiment, the filter 500 may be a panel filter comprised of wet-laid glass having a HEPA rating of 14. Although this may be the best solution in terms of particle capture efficiency, a high penalty in resistance to air flow increases the number of filters needed to maintain a predefined maximum static pressure, for example, between about 0.25 to about 0.50 inches water gage.

In another alternative embodiment, the filter 500 may be a wet-laid glass fiber MV16 having fully sealed filter elements. This solution provides a good compromise between resistance to air and efficiency in particle removal for the user prioritizing extra security over optimal installation and operation cost. Specifically, a Camfil Farr Durafil 4V MV16 modified to be fully sealed has been proven both in research and practice to effectively prevent the spread of PRRS-virus.

In another alternative embodiment, the filter 500 may be a wet-laid glass fiber MV14 having fully sealed filter elements. This solution provides a good compromise between resistance to air and efficiency in particle removal for the user prioritizing optimal installation and operation cost over the extra security the modified Camfil Farr Durafil MV16 provides. The fully sealed Camfil Farr Durafil 4V MV14 has been proven in with good results in laboratory testing to effectively reduce the risk of PRRS-virus spread.

In another alternative embodiment, the filter 500 may be an air-laid glass fiber MV14 having fully sealed filter elements. This solution provides a lower cost solution to the three prior alternatives but has also been proven in laboratory testing not to be as efficient in preventing the spread of PRRS-virus.

It is contemplated that fully sealed filters having alternative constructions and meeting the performance criteria set forth above may also be utilized for effectively filtering the air entering an animal enclosure. For example, fully sealed extended surface filters of various configurations may be utilized. Examples of extended surface filters include non-supported pocket filters (such as bag filters), supported cartridge filters, rigid cell filters, v-bank filters, pleated filters with corrugated separators and pleated panel filters, among others. Non-supported pocket filters require structure to prevent the bag from collapsing at low flows.

FIGS. 8A-D depict one embodiment of a fully sealed, non-supported pocket filter 800. The pocket filter 800 includes a frame 802 fully sealed to a bag 804. The bag 804 is fabricated from a filtration media suitable for meeting the criteria set forth above. Stitching 816 of the bag 804 may be sealed, for example, with a polyurethane sealant or other suitable sealant, to prevent leakage which may result in lower efficiencies at low flow rates. The opening of the bag 804 is continuously sealed to the frame 802, for example, by a sealant, clamp or the like. In the embodiment depicted in FIG. 8B, the edge of the bag 804 defining the opening is sealingly clamped between mating sections 808, 810 of the frame 802.

The bag 804 is held from collapsing during low flow conditions by a spacer 806. The spacer 806 is an air permeable object of sufficient rigidity to maintain the opposing sides of the bag 804 in a spaced apart relation without introduction of undue pressure drop. In the embodiment depicted in FIGS. 8A-C, the spacer 806 is in the form of a wire frame that follows the edges of the bag 804. The wire frame includes tabs 814 that spring into holes 812 formed in the housing 802 to secure the spacer 806 in position.

Figure 9:
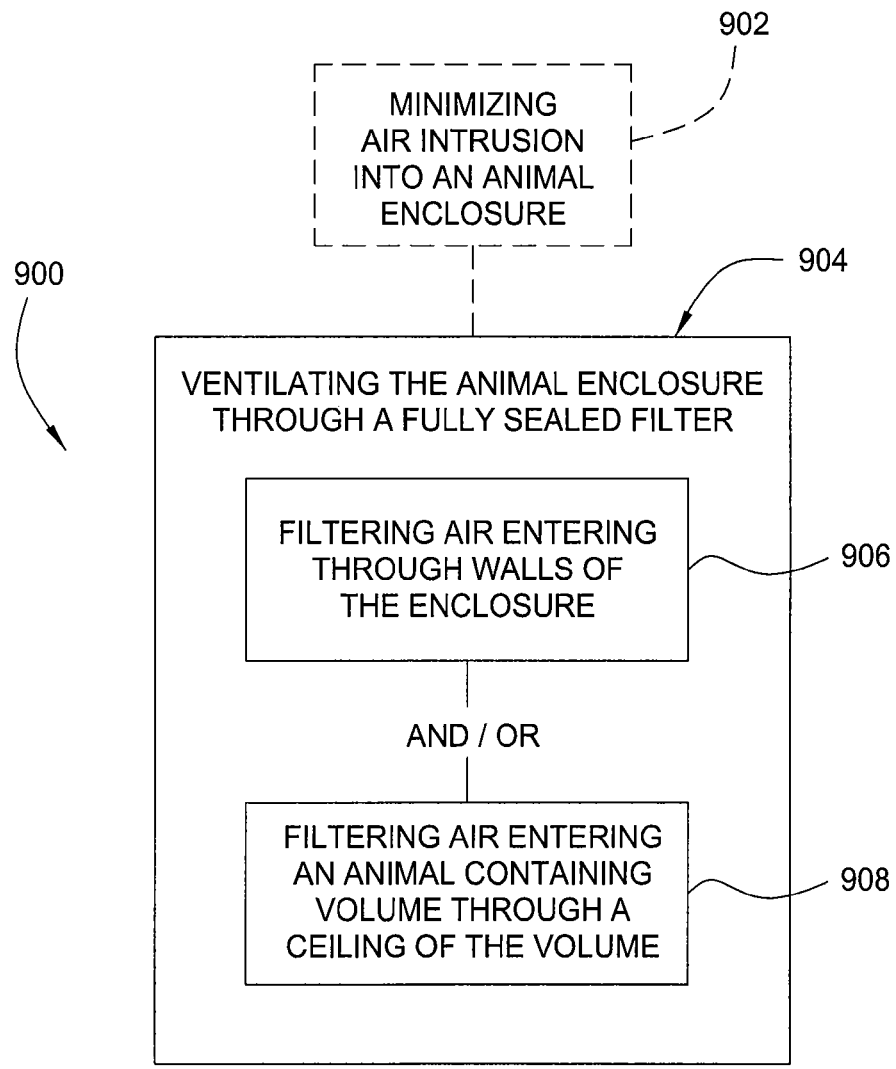
FIG. 9 is a flow diagram of one embodiment of a method for providing air to an animal enclosure.

FIG. 9 depicts one embodiment of a method 900 for ventilating an animal enclosure through a fully sealed filter. Optionally, the method 900 may include a preliminary step 900 for minimizing air intrusion into the animal enclosure which bypasses the filtering system of the enclosure. As discussed above, step 902 may be beneficially employed in existing animal enclosures which are not constructed to prevent air leakage into the enclosure through the structure. Step 902 may be performed by caulking the corners, ceiling and floor to make the seams of the enclosure substantially airtight, sealing any penetrations through the walls, ceilings or floors, such as water pipes, electrical conduits and the like, and insuring that windows are leak-free. Techniques for sealing a structure to prevent the by-pass of a filtering system are generally known to the filtration industry. At step 904, the animal enclosure volume 120 is ventilated through a fully sealed filter, such as the filters 116 and/or 106 described above. The utilization of a fully sealed filter provides a suitable level of filtration to substantially eliminate the transportation of viruses into the animal enclosure, while having a pressure drop sufficiently low enough to allow existing ventilation fans to operate the ventilation without then need for fan replacement (for capacity increase) or significant increase in energy usage. In contrast, utilization of a higher pressure drop filter (such as a HEPA filter) would render a retrofitted animal enclosure essentially inoperable, as insufficient ventilation would result from the increased restriction of air through the high resistance HEPA filters, resulting in an unhealthy environment within the enclosure.

Ventilating the animal enclosure at step 904 may be accomplished utilizing a first mode of operation described as step 906 and/or a second mode of operation described as step 908. Step 906 includes filtering the air through the walls of the enclosure 100 through filters 106 mounted in the sidewalls 102 of the enclosure 100. Air may be drawn through the filters 106 by the exhaust fan 108 and/or fan 134. In one embodiment, step 906 may be practiced as the first mode of operation above. Step 908 includes filtering the air through a plurality of filters 116 disposed in the ceiling 118 of the animal enclosure volume wherein the air is removed from the animal enclosure volume by one or more exhaust fans 134. This is described above as the second mode of operation. As discussed above, steps 906, 908 may occur simultaneously.

Additionally, a controller, for example a programmable logic controller such as available from GE Fanuc, may be utilized to practice at least portions of step 904. The controller generally includes a processor, memory and support circuits. At least portions of the method 900 may be stored in the memory of the controller, or accessed by the controller, to control the operation of the exhaust fans. For example, the controller may turn the exhaust fan 106 on in response to information provided to the controller by a sensor disposed inside the enclosure indicating that the temperature inside the enclosure exceeds a predetermined temperature. In another example, the controller may actuate the sealing mechanism 132 when the exhaust fan 106 is off so that flow through the filters 106 is prevented.

It is unexpected that filters designed in a fully sealed configuration perform significantly better in terms of particle separation at low flows than non-fully sealed configurations. In most conventional applications, the extra seal would not provide any advantage due to the higher air flow and, therefore, is not commonly utilized by the filtration industry. In this unique implementation were the flow rates are very low and the demand for particle separation is high, the fully sealed filters provide a significant improvement over conventional filter designs. The fully sealed filter has demonstrated through lab testing using both an aerosol of diluted KCL and through the use of aerosol containing the actual PRRS-virus to provide a significant advantage in terms of virus and particle caption capability while having energy usage levels that enable commercial realization of this solution.

Although various embodiments which incorporate the teachings of the present invention have been shown and described in detail herein, those skilled in the art can readily devise many other varied embodiment that still incorporate these teachings.

What is claimed is:

1. A method for providing clean air to an animal enclosure, comprising:
    removing air from an animal containing volume via at least one low pressure exhaust fan, wherein the air within the animal containing volume is maintained at a pressure of 0.05 to about 0.50 inches water gage less than that of an environment surrounding the animal containing volume, the animal containing volume defined within an animal enclosure having a ceiling, sidewalls, and a floor, the animal containing volume for containing a plurality of animals, the animal enclosure additionally having a pit located below the floor for receiving waste from the animals through the floor; and
    filtering air being pulled into the enclosure by the at least one exhaust low pressure fan using at least one fully sealed filter, the at least one fully sealed filter having particle separation sufficiently efficient to prevent detection of live (PRRS-) virus downstream of the filter, using polymerase chain reaction (PCR) analysis of samples collected with a cyclonic aerosol collector, the at least one fully sealed filter having an efficiency rating of about 60 to 99 percent at 0.4 micron particles at 2000 CFM flow rates and providing equal or better particle capture at air velocities at 200-600 CFM flow rates, and wherein the efficiency rating of the at least one fully sealed filter is selected from MERV 13-16 and ASHRAE 52;
    wherein the at least one fully sealed filter includes a v-bank filter having a housing and a plurality of filter elements, wherein all edges of each filter element are sealed to the housing to prevent air from by-passing each filter element when in use.

2. The method of claim 1 further comprising:
    sealing the animal enclosure to minimize air leakage by-passing the at least one fully sealed filter.

3. The method of claim 1, wherein filtering air further comprises:
pulling air from an attic plenum through the at least one fully sealed filter and into the animal containing volume.

4. The method of claim 3, wherein removing air further comprises:
pulling air from the animal containing volume into a pit located below a floor of the animal enclosure, the pit ventilated by the at least one low pressure exhaust fan.

5. The method of claim 1, wherein filtering air further comprises:
pulling air through at least one sidewall of the animal enclosure, the at least one fully sealed filter sealingly mounted to the sidewall.

6. The method of claim 5, wherein removing air further comprises:
pulling air from the animal containing volume through one of the sidewalls of the animal enclosure by the at least one low pressure exhaust fan.

7. The method of claim 1 further comprising:
closing a sealing mechanism to prevent a flow of air through a first group of the fully sealed filters, wherein the first group of fully sealed filters is mounted to the sidewall of the animal enclosure, wherein a second group of the fully sealed filters allow air into the animal enclosure volume.

8. The method of claim 7, wherein the at least one low pressure exhaust fan ventilates a pit and the second group of the fully sealed filters allow air into the animal enclosure volume through a ceiling of the animal enclosure volume.

9. The method of claim 1, wherein
the animal enclosure having the at least one fully sealed filter including a first fully sealed filter and a second fully sealed filter, the at least one low pressure exhaust fan including a first exhaust fan and a second exhaust fan;
the step of removing air comprising operating the first exhaust fan to remove air from the animal containing volume via the pit.

10. The method of claim 9 further comprising:
operating the second exhaust fan to remove air from the animal containing volume via a passage formed through the sidewalls.

11. The method of claim 10 further comprising:
filtering air being pulled into the enclosure by the second exhaust fan using at least one of the fully sealed filters.

12. The method of claim 9 further comprising:
operating the second exhaust fan to remove air from the animal containing volume via a passage formed through the sidewalls when a temperature of the animal containing volume exceeds a predetermined level.

13. The method of claim 9 further comprising:
operating the second exhaust fan to remove air from the animal containing volume via a passage formed through the sidewalls when a temperature of the animal containing volume exceeds a predetermined level; and
sealingly preventing air from passing through the second fully sealed filters when the second exhaust fan is not in operation.

14. The method of claim 9, wherein the first fully sealed filter is mounted to the sidewall of the animal enclosure.

15. The method of claim 9, wherein the second fully sealed filter filters air entering through at least one of eaves or roof of the animal enclosure.

16. The method of claim 9, wherein the second fully sealed filter filters air passing through the ceiling of the animal enclosure.

17. A method for providing clean air to an animal enclosure, comprising:
filtering air entering an animal enclosure by removing air from an interior of said animal enclosure via at least one low pressure exhaust fan, said animal enclosure having a ceiling, sidewalls, and a floor defining an animal containing volume for containing a plurality of animals, the animal enclosure additionally having a pit located below the floor for receiving waste from the animals through the floor, the air filtered by passing through a fully sealed filter at a flow rate of 200-600 CFM, the fully sealed filter having a rating selected from a group consisting of MERV 13-16 and ASHRAE 52, the fully sealed filter having particle separation sufficiently efficient to prevent detection of live (PRRS-) virus downstream of the filter, using polymerase chain reaction (PCR) analysis of samples collected with a cyclonic aerosol collector, the fully sealed filter having an efficiency rating of about 60 to 99 percent at 0.4 micron particles at 2000 CFM flow rates and providing equal or better particle capture at air velocities at 200-600 CFM flow rates, wherein the fully sealed filter includes a housing and at least one filter element, wherein all edges of the at least one filter element is sealed to the housing to prevent air from by-passing each filter element when in use, and wherein the air within the animal enclosure is maintain at a pressure of 0.05 to about 0.50 inches water gage less than that of an environment surrounding the animal enclosure.

* * * * *